United States Patent
Tu

(10) Patent No.: US 8,711,443 B2
(45) Date of Patent: Apr. 29, 2014

(54) COMPACT MULTI-FUNCTIONAL SCANNING APPARATUS WITH RETRACTABLE FLATBED SCANNER

(75) Inventor: Ching-Jung Tu, Hsinchu (TW)

(73) Assignee: Avison Inc. (TW)

( * ) Notice: Subject to any disclaimer, the term of this patent is extended or adjusted under 35 U.S.C. 154(b) by 78 days.

(21) Appl. No.: 13/467,719

(22) Filed: May 9, 2012

(65) Prior Publication Data
US 2012/0307324 A1 Dec. 6, 2012

(30) Foreign Application Priority Data
Jun. 3, 2011 (TW) .............................. 100210181 U

(51) Int. Cl.
*H04N 1/04* (2006.01)
(52) U.S. Cl.
USPC ............ 358/474; 358/496; 358/497; 358/498

(58) Field of Classification Search
USPC .......................... 358/474, 496, 497, 498, 473
See application file for complete search history.

(56) References Cited

U.S. PATENT DOCUMENTS

| 6,160,642 | A | * | 12/2000 | Mui et al. | 358/498 |
| 6,628,433 | B1 | * | 9/2003 | Westcott et al. | 358/474 |
| 2003/0095296 | A1 | * | 5/2003 | Terashima et al. | 358/498 |

* cited by examiner

*Primary Examiner* — Houshang Safaipour

(57) ABSTRACT

A compact multi-functional scanning apparatus includes a sheet-fed scanner, a casing and a flatbed scanner. The casing is attached to the sheet-fed scanner and has a recess. The flatbed scanner is movable between a retracted position within the recess and a deployed position outside the recess. In the deployed position the flatbed scanner is enabled to perform a flatbed-scanning task. An open end of the recess is located on a lateral side of the casing, and the flatbed scanner is movable into and out of the recess through the open end.

9 Claims, 8 Drawing Sheets

US 8,711,443 B2

COMPACT MULTI-FUNCTIONAL SCANNING APPARATUS WITH RETRACTABLE FLATBED SCANNER

This application claims priority of No. 100210181, filed in Taiwan R.O.C. on Jun. 3, 2011, under 35, USC 119, the entire content of which is hereby incorporated by reference.

BACKGROUND OF THE INVENTION

1. Field of the Invention

The present invention relates to a scanning apparatus, and more particularly to a compact multi-functional scanning apparatus with a retractable flatbed scanner.

2. Related Art

A sheet-fed scanning apparatus has a sheet-fed scan capability, and a flatbed scanning apparatus has a flatbed scan capability, whereas a composite scanning apparatus possesses both of the flatbed and sheet-fed scan capabilities. So, due to its versatility, the composite scanning apparatus becomes a document scanner frequently used in the office.

Usually, the composite scanning apparatus is composed of an A4-size sheet-fed scanner and an A4-size flatbed scanner, or composed of an A3-size sheet-fed scanner and an A3-size flatbed scanner. The A4-size composite scanning apparatus is designed to scan a sheet of size of an A4, or Letter sheet. The A3-size composite scanning apparatus, on the other hand, is more flexible and is fit for scanning documents of various sizes sheets.

However, it is not common for users to scan A3-size documents. In addition, the A3-size composite scanning apparatus occupies a relatively large space and is not suitable for small offices.

SUMMARY OF THE INVENTION

Accordingly, the present invention has been proposed to solve the problems of the prior art, and it is an object of the present invention to provide a compact multi-functional scanning apparatus with a retractable flatbed scanner, so as to reduce the space occupied by the apparatus and expand the versatility of the apparatus.

To achieve the above-identified object, the present invention provides a compact multi-functional scanning apparatus including a sheet-fed scanner, a casing and a flatbed scanner. The casing is attached to the sheet-fed scanner and has a recess. The flatbed scanner is movable between a retracted position within the recess and a deployed position outside the recess. In the deployed position the flatbed scanner is enabled to perform a flatbed-scanning task. An open end of the recess is located on a lateral side of the casing, and the flatbed scanner is movable into and out of the recess through the open end.

In the compact multi-functional scanning apparatus, the flatbed scanner is retracted into the recess when not being used so that the overall size of the compact multi-functional scanning apparatus is reduced. When the flatbed scanner has to be used, the flatbed scanner is pulled out of the recess, and the flatbed and sheet-fed scan operations can be performed concurrently or alternatively.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 1:
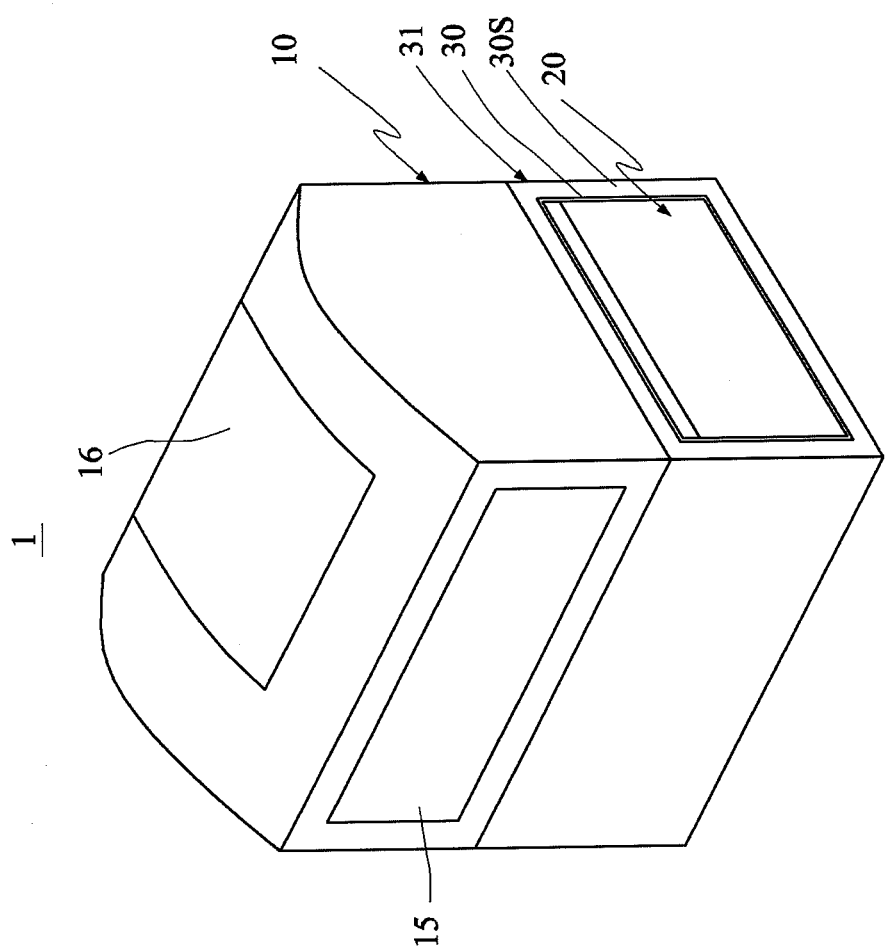
FIGS. 1 to 3 show three states of a compact multi-functional scanning apparatus according to a first embodiment of the present invention.
Figure 2:
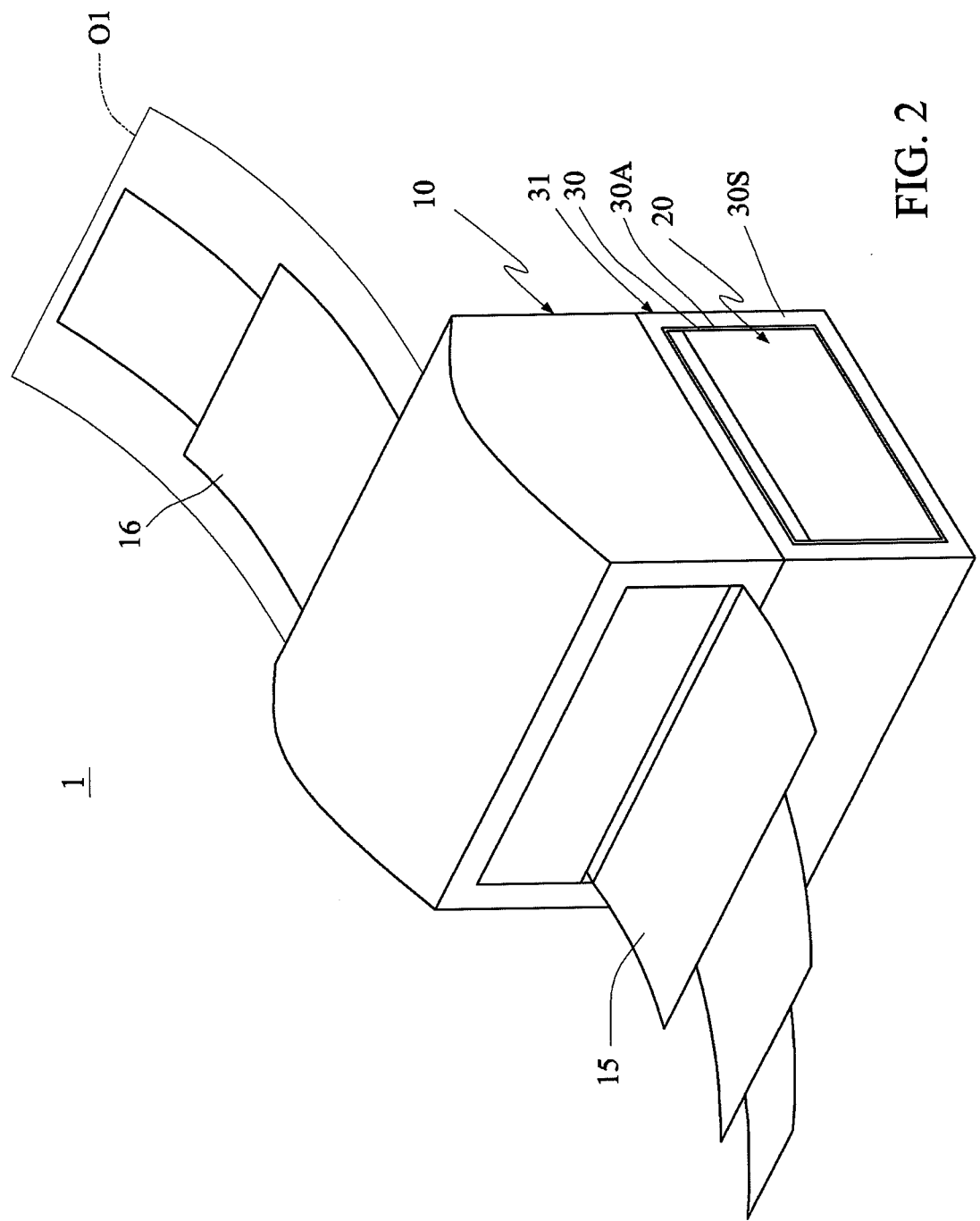
Figure 3:
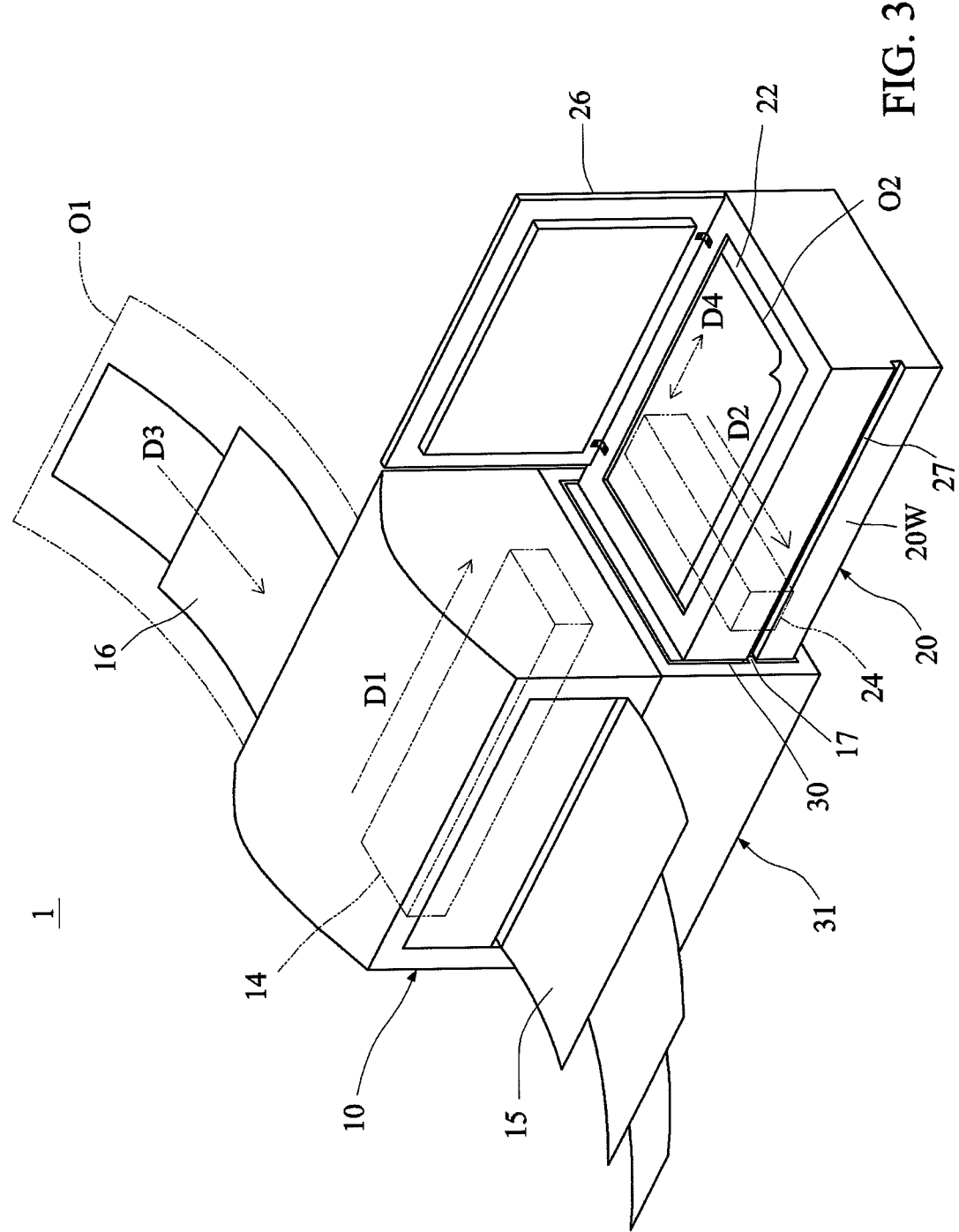

FIGS. 1 to 3 are pictorial views showing three states of a compact multi-functional scanning apparatus 1 according to a first embodiment of the present invention. Referring to FIGS. 1 to 3, the compact multi-functional scanning apparatus 1 of this embodiment includes a sheet-fed scanner 10, a casing 31 and a flatbed scanner 20. The casing 31 is attached to the sheet-fed scanner 10 and has a recess 30. The flatbed scanner 20 is movable between a retracted position (see FIGS. 1 and 2) within the recess 30 and a deployed position (see FIG. 3) outside the recess 30. In the deployed position, as shown in FIG. 3, the flatbed scanner 20 is enabled to perform a flatbed-scanning task. An open end 30A of the recess 30 is located on a lateral side 30S of the casing 31, and the flatbed scanner 20 is movable into and out of the recess 30 through the open end 30A. The sheet-fed scanner 10 is capable of performing a sheet-fed-scanning task when the flatbed scanner 20 is in either the deployed position or the retracted position. In this embodiment, the casing 31 is disposed underneath the sheet-fed scanner 10 and the flatbed scanner 20 is movable between the retracted position and the deployed position along a path substantially perpendicular to a sheet-feeding direction D3 of the sheet-fed scanner 10. The sheet-fed-scanning task is to acquire an image of a document using a stationary scanning module, while the flatbed-scanning task is to acquire an image of a stationary document using a movable scanning module.

Figure 4:
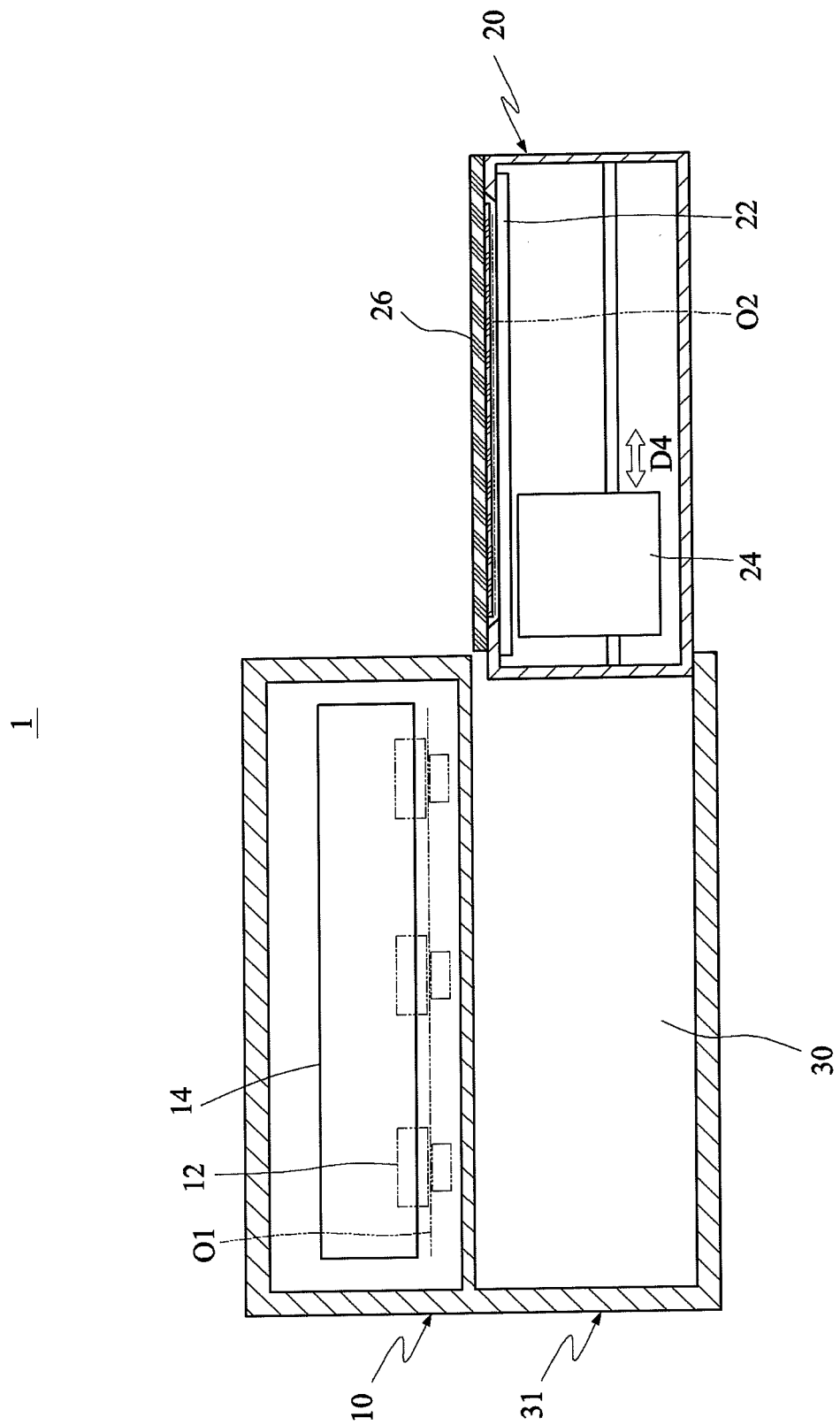
FIG. 4 is a front view of the compact multi-functional scanning apparatus according to the first embodiment of the present invention.

FIG. 4 is a front view of the compact multi-functional scanning apparatus 1. Referring to FIGS. 1 to 4, the sheet-fed scanner 10 includes a first scanning module 14 and a sheet transporting mechanism 12. A supply tray 16 of the sheet-fed scanner 10 is for loading an original O1. The supply tray 16 may have a multi-stage structure and can be retracted into or closed upon a housing of the sheet-fed scanner 10. The original transporting mechanism 12 transports the original O1 from the supply tray 16 past the first scanning module 14. The original transporting mechanism 12 includes, without limitation to, a pickup roller, a separation roller, a friction component and transporting rollers. The first scanning module 14 performs an image scan in a first scan direction D1. The first scan direction D1 may also be referred to as a primary scan direction, which is usually the direction in which image sensor units (not shown) of the first scanning module 14 are arranged. The original O1 is transported past the first scanning module 14 in a first moving direction (sheet-feeding direction) D3 substantially perpendicular to the first scan direction D1. The original O1, after been scanned by the first scanning module 14, is transported to a retractable discharge tray 15.

The flatbed scanner 20 includes a scan platen 22 and a second scanning module 24. The scan platen 22 supports an original O2. The second scanning module 24, disposed below the scan platen 22, performs another image scan in a second scan direction D2. The second scan direction D2 is the primary scan direction of the second scanning module 24, and a second moving direction D4 of the second scanning module 24 is perpendicular to the second scan direction D2.

In this embodiment, the sheet-fed scanner 10 and flatbed scanner 20 are disposed such that the second scan direction D2 of the second scanning module 24 is substantially perpendicular to the first scan direction D1.

As shown in FIG. 3, the compact multi-functional scanning apparatus 1 further includes a sliding member 27, mounted on an outer wall 20W of the flatbed scanner 20 and interacting with a supplement guiding member 17 in the recess 30, for facilitating movement of the flatbed scanner 20 into and out of the recess 30. The sliding member 27 mates with the supplement guiding member 17, so that the flatbed scanner 20 can be smoothly moved into and out of the recess 30. It is to be noted that a driving mechanism (not shown) may further be provided to move the flatbed scanner 20 into and out of the recess 30 in addition to manual movement of the flatbed scanner 20.

As shown in FIG. 3, the flatbed scanner 20 further includes an upper cover 26, which may be opened with respect to and closed upon the scan platen 22 of the flatbed scanner 20. When the entire flatbed scanner 20 is retracted into the recess 30, the upper cover 26 is closed upon the scan platen 22 of the flatbed scanner 20, as shown in FIG. 4. When using the flatbed scanner 20, the user at first opens the upper cover 26, then places the original O2, and then closes the upper cover 26. However, the upper cover 26 is not an essential component. The flatbed scanner 20 can scan the image of the original O2 and be retracted into the recess 30 without the upper cover 26.

Figure 5:
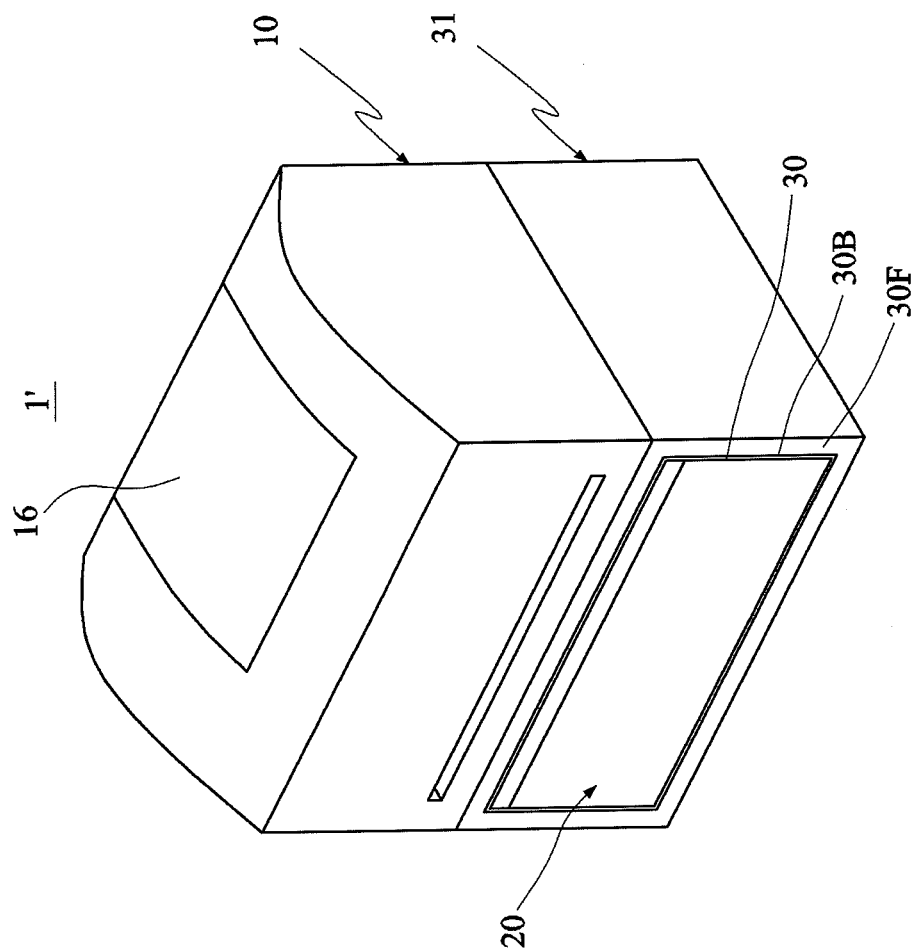
FIGS. 5 and 6 are pictorial views of two states of a compact multi-functional scanning apparatus according to a second embodiment of the present invention.
Figure 6:
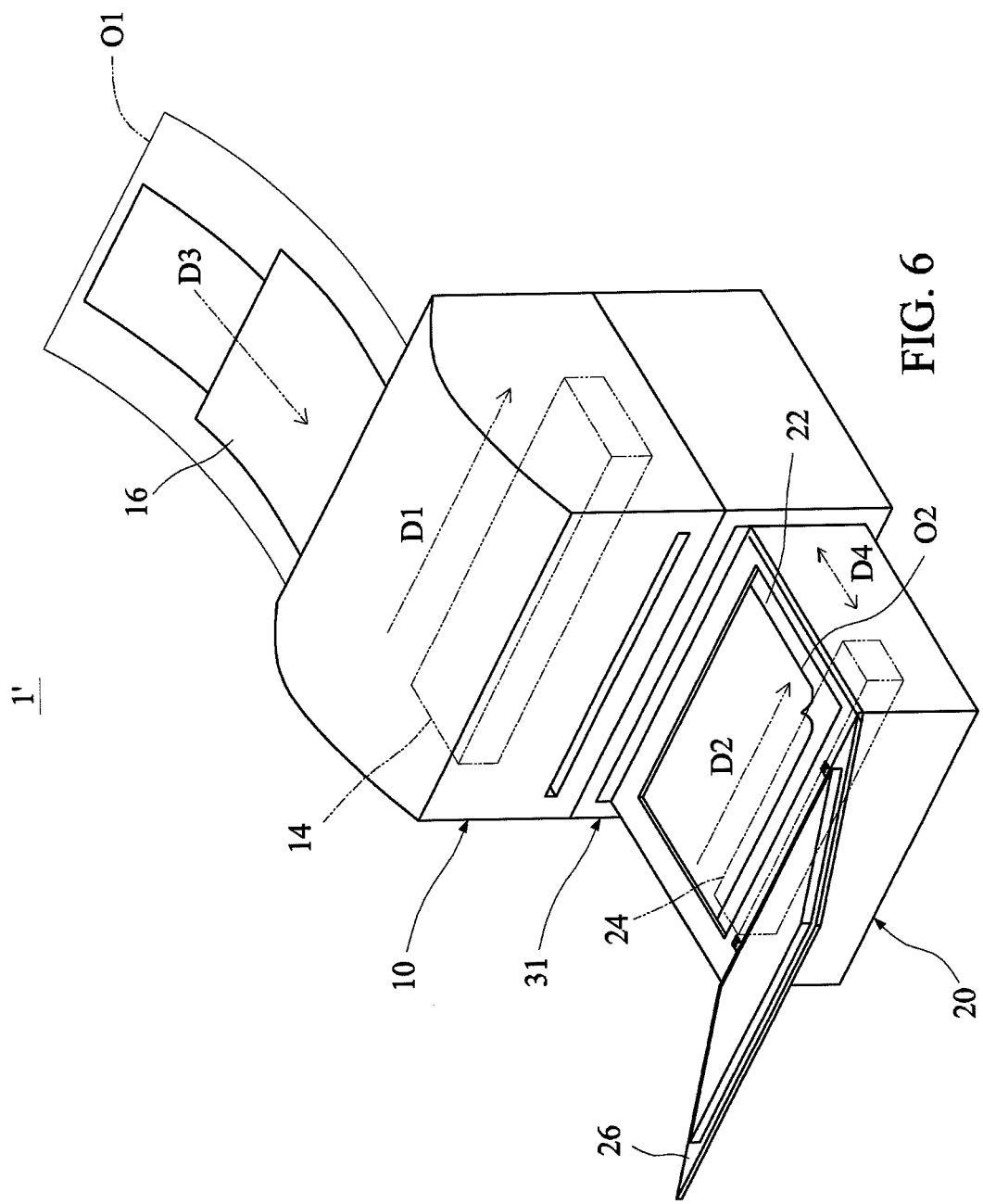

FIGS. 5 and 6 are pictorial views of two states of a compact multi-functional scanning apparatus 1' according to a second embodiment of the present invention. As shown in FIGS. 5 and 6, this embodiment is similar to the first embodiment except that the second scan direction D2 is substantially parallel to the first scan direction D1. The flatbed scanner 20 is movable between the retracted position and the deployed position along a path substantially parallel to the sheet-feeding direction D3 of the sheet-fed scanner 10. In addition, an open end 30B of the recess 30 is formed on another lateral side 30F of the casing 31. The flatbed scanner 20 is movable out of the recess 30 through the open end 30B in a path substantially parallel to the sheet-feeding direction (first moving direction) D3.

In this embodiment, when the flatbed scanner 20 is moved out of the recess 30, the scan platen 22 of the flatbed scanner 20 in the deployed position serves as a discharge tray for retaining the original O1 scanned and discharged by the sheet-fed scanner 10. In addition, the upper cover 26 of the flatbed scanner 20 opened with respect to the scan platen 22 of the flatbed scanner 20 in the deployed position also can serve as a discharge tray for retaining the original O1 scanned and discharged by the sheet-fed scanner 10 when the flatbed scanner 20 is moved out of the recess 30. That is, when the length of the flatbed scanner 20 is too short to support the scanned original O1, the upper cover 26 can be opened to lengthen the discharge tray and satisfy various requirements.

Figure 7:
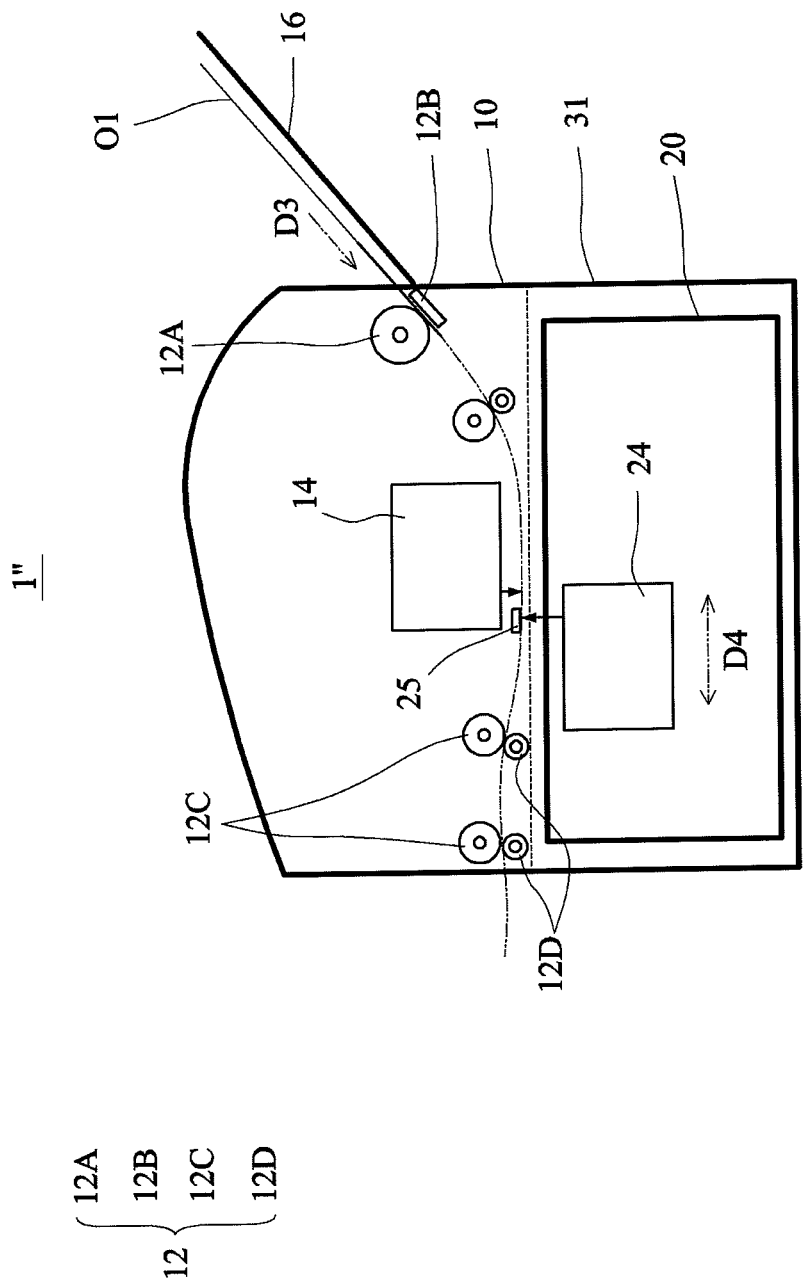
FIG. 7 is a side view of a compact multi-functional scanning apparatus according to a third embodiment of the present invention.

FIG. 7 is a side view of a compact multi-functional scanning apparatus 1" according to a third embodiment of the present invention. In this embodiment, the flatbed scanner 20 in the retracted position serves as a second scan head of the compact multi-functional scanning apparatus 1", so that the compact multi-functional scanning apparatus 1" has a duplex sheet-fed scan function for scanning two-sided documents, in addition to the simplex sheet-fed and flatbed document-scan functions. In the duplex sheet-fed scan mode, the first scanning module 14 of the sheet-fed scanner 10 and the second scanning module 24 of the flatbed scanner 20 in the retracted position scan a front side and a reverse side of the original O1 and obtain images representative of the front side and the reverse side of the original O1, respectively. The flatbed scanner 20 of this embodiment has no upper cover. As shown in FIG. 7, it is found that the original transporting mechanism 12 includes a sheet-input roller 12A, a friction component 12B and multiple sets of transporting rollers 12C and 12D. Therefore, the originals O1 on the supply tray 16 are separated by the sheet-input roller 12A and the friction component 12B, and the transporting rollers 12C and 12D transport the original O1 past and then out of the first scanning module 14 and the second scanning module 24 one by one. According to this design, the second scanning module 24 executes a dynamic calibration procedure, in which a standard color plate 25 is repeatedly scanned by the movable second scanning module 24 at different positions, to obtain reference data for compensating the color of the scanned image.

Figure 8:
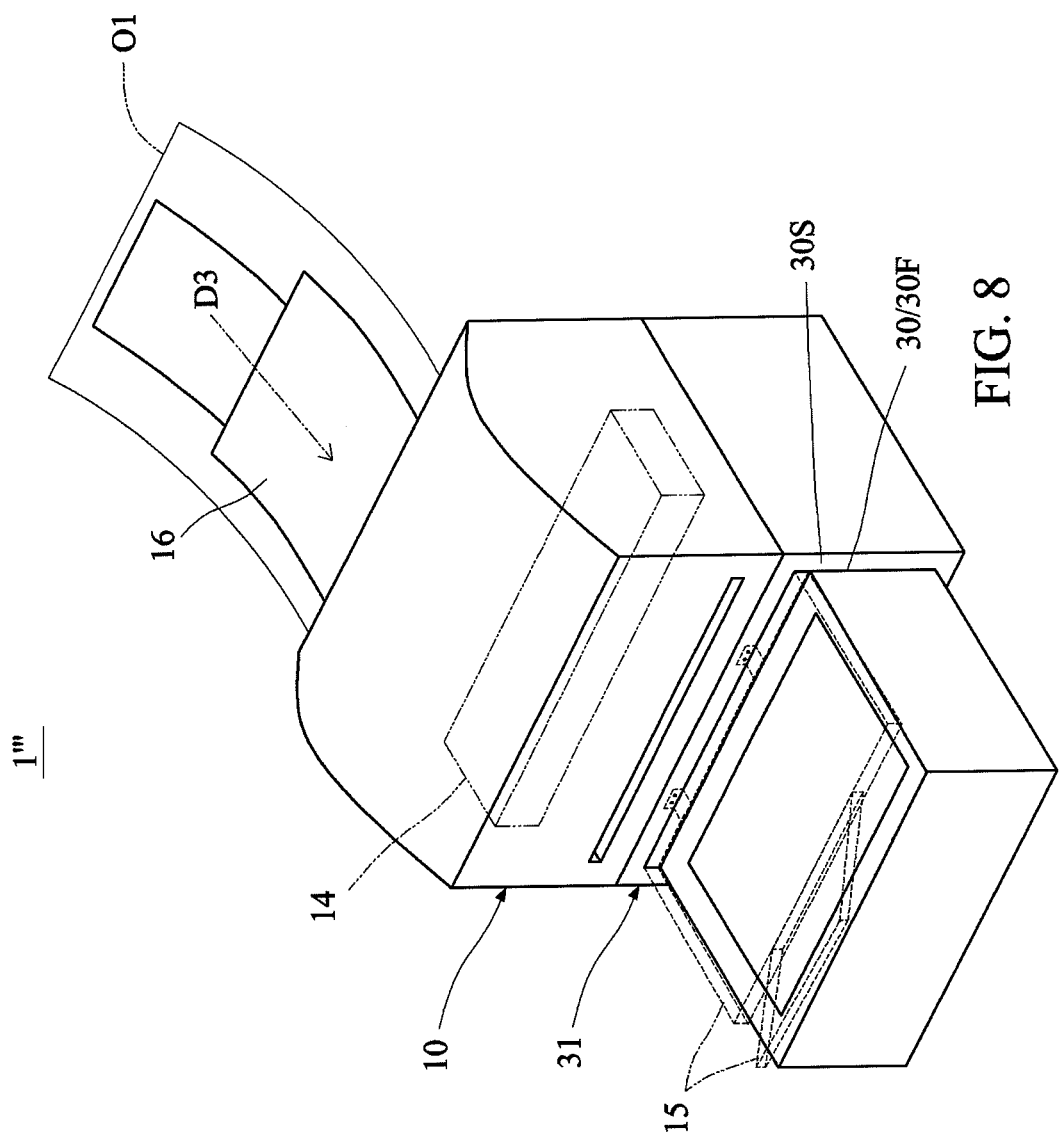
FIG. 8 is a pictorial view of a compact multi-functional scanning apparatus according to a fourth embodiment of the present invention.

FIG. 8 is a pictorial view of a compact multi-functional scanning apparatus 1''' according to a fourth embodiment of the present invention. As shown in FIG. 8, this embodiment is similar to the second embodiment except that the scanning apparatus 1''' of this embodiment further includes a discharge tray 15, pivotally connected at one end to the casing 31 and positioned at the open end 30B of the recess 30, for retaining originals O1 scanned and discharged by the sheet-fed scanner 10. In this embodiment, the discharge tray 15 is lifted up and supported by the flatbed scanner 20 in the deployed position in order to retain the originals O1 discharged by the sheet-fed scanner 10.

In the compact multi-functional scanning apparatus of the present invention, the flatbed scanner can be retracted when not being used so that the overall size of the compact multi-functional scanning apparatus is reduced. When the flatbed scanner is to be used, the flatbed scanner is pulled out of the recess, and the flatbed-scanning and sheet-fed-scanning tasks can be performed concurrently or alternatively.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A compact multi-functional scanning apparatus, comprising:
    a sheet-fed scanner comprising a first scanning module performing an image scan in a first scan direction, and an original transporting mechanism;
    a casing attached to the sheet-fed scanner and having a recess, the casing being disposed underneath the sheet-fed scanner; and
    a flatbed scanner movable between a retracted position within the recess and a deployed position outside the recess, the flatbed scanner comprising a scan platen and a second scanning module, disposed below the scan platen, for performing another image scan in a second scan direction, wherein in the deployed position the flatbed scanner is enabled to perform a flatbed-scanning task;

wherein an open end of the recess is located on a lateral side of the casing, and the flatbed scanner is movable into and out of the recess through the open end; and wherein the scan platen of the flatbed scanner in the deployed position serves as a discharge tray for retaining originals scanned and discharged by the sheet-fed scanner.

2. The apparatus according to claim 1, wherein the flatbed scanner is movable between the retracted position and the deployed position along a path substantially perpendicular to a sheet-feeding direction of the sheet-fed scanner.

3. The apparatus according to claim 1, wherein the flatbed scanner is movable between the retracted position and the deployed position along a path substantially parallel to a sheet-feeding direction of the sheet-fed scanner.

4. The apparatus according to claim 1, wherein the second scan direction is substantially perpendicular to the first scan direction.

5. The apparatus according to claim 1, wherein the second scan direction is substantially parallel to the first scan direction.

6. The apparatus according to claim 1, wherein in a duplex sheet-fed scan mode, the first scanning module of the sheet-fed seamier and the second scanning module of the flatbed scanner in the retracted position scan a front side and a reverse side of an original, respectively.

7. A compact multi-functional scanning apparatus, comprising:
   a sheet-fed scanner comprising a first scanning module performing an image scan in a first scan direction, and an original transporting mechanism;
   a casing attached to the sheet-fed scanner and having a recess, the casing being disposed underneath the sheet-fed scanner; and
   a flatbed scanner movable between a retracted position within the recess and a deployed position outside the recess, the flatbed scanner comprising a scan platen and a second scanning module, disposed below the scan platen, for performing another image scan in a second scan direction, wherein in the deployed position the flatbed scanner is enabled to perform a flatbed-scanning task;

wherein an open end of the recess is located on a lateral side of the casing, and the flatbed scanner is movable into and out of the recess through the open end; and wherein the flatbed scanner further comprises an upper cover, wherein the upper cover opened with respect to the scan platen of the flatbed scanner in the deployed position serves as a discharge tray for retaining originals scanned and discharged by the sheet-fed scanner.

8. A compact multi-functional scanning apparatus, comprising:
   a sheet-fed scanner comprising a first scanning module performing an image scan in a first scan direction, and an original transporting mechanism;
   a casing attached to the sheet-fed scanner and having a recess, the casing being disposed underneath the sheet-fed scanner;
   a flatbed scanner movable between a retracted position within the recess and a deployed position outside the recess, the flatbed scanner comprising a scan platen and a second scanning module, disposed below the scan platen, for performing another image scan in a second scan direction, wherein in the deployed position the flatbed scanner is enabled to perform a flatbed-scanning task; and wherein an open end of the recess is located on a lateral side of the casing, and the flatbed scanner is movable into and out of the recess through the open end; and a discharge tray, pivotally connected at one end to the casing and positioned at the open end of the recess, for retaining originals scanned and discharged by the sheet-fed scanner, wherein the discharge tray is lifted up and supported by the flatbed scanner in the deployed position in order to receive the originals discharged by the sheet-fed scanner.

9. The apparatus according to claim 1, further comprising a sliding member, mounted on an outer wall of the flatbed scanner and interacting with a supplement guiding member in the recess, for facilitating movement of the flatbed scanner into and out of the recess.

* * * * *